United States Patent [19]
Chang et al.

[11] 3,894,106

[45] July 8, 1975

[54] CONVERSION OF ETHERS

[75] Inventors: Clarence D. Chang, Princeton; William H. Lang, Pennington, both of N.J.; Anthony J. Silvestri, Morrisville, Pa.

[73] Assignee: Mobil Oil Corporation, New York, N.Y.

[22] Filed: Aug. 9, 1973

[21] Appl. No.: 387,222

[52] U.S. Cl............. 260/668 R; 208/135; 260/673; 208/141; 260/673.5; 260/676 R; 260/682
[51] Int. Cl............................................. C07c 1/20
[58] Field of Search.... 208/135, 141, 668 R, 449 R, 208/449 M, 449 L; 260/449.5, 671 R, 671 C, 671 M, 673, 673.5, 682; 252/455 Z

[56] References Cited
UNITED STATES PATENTS

| | | | |
|---|---|---|---|
| 3,728,408 | 4/1973 | Tobias | 260/668 C |
| 3,751,504 | 8/1973 | Keown et al. | 260/672 T |
| 3,751,506 | 8/1973 | Burress | 260/671 R |
| 3,755,483 | 8/1973 | Burress | 260/671 R |

*Primary Examiner*—C. Davis
*Attorney, Agent, or Firm*—Charles A. Huggett; Michael G. Gilman

[57] ABSTRACT

Process of converting aliphatic ethers, particularly alkyl ethers, to other desirable products by contacting such with a crystalline aluminosilicate molecular sieve catalyst having a constraint index of about 1 to 12 and a silica to alumina ratio of at least about 12 at elevated temperature. The catalyst preferably has a crystal density in the hydrogen form of not substantially below about 1.6 grams per cubic centimeter. Products produced by such conversion vary with temperature, with conversion to aromatic rings and substituted aromatic rings predominating at higher temperatures of about 500° to 1000°F.

9 Claims, No Drawings

CONVERSION OF ETHERS

This invention relates to conversion of certain organic compounds to other, more complicated organic compounds. This recently discovered novel class of zeolites has some unusual properties. These catalysts induce profound transformations of aliphatic hydrocarbons to aromatic hydrocarbons in commercially desirable yields. Although they have unusually low alumina contents, i.e. high silica to alumina ratios, they are very active even when the silica to alumina ratio exceeds 30. The activity is surprising since the alumina in the zeolite framework is believed responsible for catalytic activity. These catalysts retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity.

An important characteristic of the crystal structure of this class of zeolites is that it provides constrained access to, and egress from, this intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type catalyst useful in this invention posess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although catalysts with a silica to alumina ratio of at least 12 are useful, it is preferred to use catalysts having higher ratios of at least about 30. Such catalysts, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by eight membered rings of oxygen atoms, then access to molecules of larger cross-section than normal hexane is excluded and the zeolite is not of the desired type. Windows of 10-membered rings are preferred, although excessive puckering or pore blockage may render these catalysts ineffective. Twelve-membered rings do not generally appear to offer sufficient constraint to produce the advantageous conversions, although structures can be conceived, due to pore blockage or other cause, that may be operative.

Rather than attempt to judge from crystal structure whether or not a catalyst posesses the necessary constrained access, a simple determination of the "constraint index" may be made by passing continuously a mixture of equal weight of normal hexane and 3-methylpentane over a small sample, approximately 1 gram or less, of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1000°F for at least 15 minutes. The catalyst is then flushed with helium and the temperature adjusted between 550° and 950°F to give an overall conversion between 10 and 60%. The mixture of hydrocarbons is passed at 1 liquid hourly space velocity (i.e. 1 volume of hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The constraint index is calculated as follows:

$$\text{Constraint Index} = \frac{\log_{10} \text{ (fraction of n-hexane remaining)}}{\log_{10} \text{ (fraction of 3-methylpentane remaining)}}$$

The constraint index approximates the ratio of the cracking rate constants for the two hydrocarbons. Catalysts suitable for the present invention are those having a constraint index from 1.0 to 12.0, preferably 2.0 to 7.0.

The class of zeolites defined herein is exemplified by ZSM-5, ZSM-11, ZSM-12, ZSM-21, TEA mordenite and other similar materials. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in West German Offenlagunschrifft No. 2,213,109, the entire contents of which are incorporated herein by reference.

ZSM-21 is more particularly described in U.S. application, Ser. No. 358,192, filed May 7, 1973, and now abandoned, the entire contents of which are incorporated herein by reference.

TEA mordenite is more particularly described in U.S. application Ser. No. 130,442 filed Apr. 11, 1971, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000°F for 1 hour, for example, followed by base exchange with ammonium salts followed by calcination at 1000°F in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1000°F for from about 15 minutes to about 24 hours.

Natural zeolites may sometimes be converted to this type zeolite catalysts by various activation procedures and other treatments such as base exchange, steaming, alumina extraction and calcination, in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12, ZSM-21 and TEA mordenite, with ZSM-5 particularly preferred.

The catalysts of this invention may be in the hydrogen form or they may be base exchanged or impregnated to contain ammonium or a metal cation complement. It is desirable to calcine the catalyst after base exchange. The metal cations that may be present include any of the cations of the metals of Groups I through VIII of the periodic table. However, in the case of Group IA metals, the cation content should in no case be so large as to effectively inactivate the catalyst. For example, a completely sodium exchanged H-ZSM-5 is not operative in the present invention.

In a preferred aspect of this invention, the catalysts hereof are selected as those having a crystal density, in the dry hydrogen form, of not substantially below about 1.6 grams per cubic centimeter. It has been found that zeolites which satisfy all three of these criteria are most desired because they tend to maximize the production of gasoline boiling range hydrocarbon products. Therefore, the preferred catalysts of this invention are those having a constraint index as defined above of about 1 to 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 11 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, is important as the locus of catalytic activity.

A remarkable and unique attribute of this type of zeolite is its ability to convert paraffinic hydrocarbons to aromatic hydrocarbons in exceptionally fine, commercially attractive yields by simply contacting such paraffins with such catalyst at high temperatures of about 800° to 1500°F and low space velocities of about 1 to 15 WHSV. ZSM-5 type of zeolite seems to exert little or no action upon aromatic rings present in the feed to such process or formed in such process from the point of view of destroying (cracking such rings. It does however have the ability with or without the presence of a special hydrogen transfer functionality and with or without the presence of added hydrogen in the reaction mixture, to cause paraffinic fragments, which presumably have been cracked from paraffinic feed components, to alkylate aromatic rings at somewhat lower temperatures of up to about 800° to 1000°F. It appears that the operative ranges for alkylation and formation of new aromatic rings overlap but that the optimum ranges are distinct, aromatization being at a higher temperature. The exact mechanisms for these catalytic functions are not fully known or completely understood.

It is generally known to those of routine skill in the crystalline zeolite art, that catalytic properties thereof are often diminished by contact with steam. Increasing the steam pressure, temperature and/or time of contact of the zeolite with the steam increases the diminution of catalytic properties.

It is known that many acid catalysts are capable of assisting in the dehydration of ethers to olefins. In all or at least most of these prior processes, the dehydrated product had a longest carbon atom chain length which was not longer than the longest carbon atom chain length of the reactant. For the most part, such dehydration reactions did not produce products having a molecular weight in any given hydrocarbon portion which was higher than the molecular weight of a corresponding hydrocarbon portion of the ether reactant.

It is an object of this invention to provide a novel process for converting aliphatic ethers to other valuable products, particularly higher hydrocarbons.

It is a further object of this invention to convert aliphatic ethers to olefins and/or aromatics in a very efficient manner.

It is still another object of this invention to provide a novel process for converting ethers to products having a greater number of carbon atoms in a continuous hydrocarbon portion of the product than in a hydrocarbon portion of the feed.

In accord with and fulfilling these objects, one aspect of this invention lies in the discovery that aliphatic ethers are convertible to other organic chemical products, notably aromatic hydrocarbons, by contacting such ethers with a crystalline aluminosilicate molecular sieve zeolite having a silica to alumina ratio of at least about 12 and a constraint index of about 1 to 12 at elevated temperatures, preferably about 500° to 1000°F, a pressure of about atmospheric to 3000 psig, a space velocity of about 0.5 to 1000 WHSV in the presence or absence of added hydrogen. The catalyst may be the zeolite alone or in a suitable matrix. The zeolite preferably has a crystal density in the hydrogen form of not substantially below about 1.6 grams per cubic centimeter. The ether reactant is preferably one or more alkyl ethers having 1 to 8 carbon atoms in the longest hydrocarbon constituent thereof. Mixed ethers are suitable.

According to this invention, the reactive feed to the process hereof is critically defined as consisting essentially of lower aliphatic ether compounds. This feed definition is specifically intended to distinguish from feeds used in alkylation reactions catalyzed by this type of synthetic aluminosilicate molecular sieve. In such alkylation reactions, which are considered to be the invention of other than the instant applicants, alkylating moieties, which may be ethers and/or other compounds, are reacted with the preformed and co-fed aromatic moieties. In other words, alkylation requires the co-feeding of aromatic moieties and alkylating moieties such as ethers. The instant process is to be distinguished in that it does not require or desire the co-feeding of preformed aromatic moieties.

In this regard, two very important points must be emphasized: In the first place, it has now been discovered that the presence of preformed aromatic moieties as a co-feed to this reaction does not negate the aromatization conversion of the reactants designated above as the feed to the instant process; In the second place, new aromatic moieties created from the reactants hereof by the conversion process of this invention are themselves sometimes alkylated under these processing conditions by the alkylating action of the ether and/or one or more intermediate moiety formed in the reaction being undergone. The process of this invention must therefore be distinguished from an alkylating reaction per se carried out with the same catalyst and under co-extensive reaction conditions.

In its broadest aspects, this invention envisions a process for condensing certain feed materials and growing the products thus formed into significantly different chemical moieties. The commercially most important aspect of this invention appears to be the conversion of lower alkyl ethers to aromatic compounds as aforesaid. However, as an adjunct to this conversion, the reaction can be carried out under different conditions but with the same catalyst to produce somewhat different chemical values. For example, lower alkyl ethers can be converted to olefins at somewhat lower temperatures and generally less severe operating conditions than those which result in a predominantly aromatic product.

While at first glance the formation of olefins by contacting ethers with an acidic zeolite at elevated temperatures might not seem too surprising, it must be pointed out that the olefins formed do not necessarily conform to the carbon configuration of the reactant. The olefin may and often does have a longer carbon to carbon chain than did the reacting moiety from which it was derived, usually multiples of the reactant carbon chain length. It is even more surprising that one can produce olefins such as ethylene and propylene from methyl ethers, particularly dimethyl ether, that is effectively a one carbon atom reactant.

According to this invention, aromatics are produced from lower aliphatic ethers to about 500° to 1000°F, 0 to 3000 psig and 0.5 to 50 WHSV. Olefin production seems to predominate under less severe conditions, such as reduced contact times brought about by operating at space velocities greater than about 50 WHSV. Suitable exemplary reactants include dimethyl ether, diethyl ether, methyl ethyl ether, methyl vinyl ether, ispropyl ether, n-butyl methyl ether, di-n-hexyl ether, methyl-2-ethyl hexyl ether, cyclohexyl methyl ether, etc.

It is within the scope of the invention to convert the ether compounds fed as individuals or as admixtures of normal chemical purity. It is also within the scope of this invention to feed such ether reactants in admixture with other, non-ether materials such as alcohols or carbonyl compounds. These other feed materials may be reactive or inert under the conditions of this process. Their presence or absence is not a part of this invention. Thus, for example, it is the subject of concurrently filed patent applications of different inventors to convert carbonyl containing compounds and/or alcohols to more complex compounds under substantially the same conditions as are set forth herein. The co-feeding and co-reaction of the feeds, or one of them, set forth in said other patent application with the feeds of this application, including possible interaction of these feeds and/or intermediates produced therefrom is not considered to be outside the scope of either this or that patent application. Rather, such is considered to be within the scope of each respective application as to that portion of the feed related to that application.

It is generally believed by those knowledgeable in the crystalline zeolite art that contact of a zeolite with steam is deleterious to the catalytic properties thereof and that increase in pressure temperature and/or time of contact increases the adverse effects on the catalyst. While certain types of zeolites, notably ZSM-5 type, are substantially more steam stable than other zeolites, it has been found to be possible to reduce or eliminate the hydrocarbon aromatization catalytic activity. Aromatization of aliphatic hydrocarbons as described in application Ser. No. 253,942 filed May 17, 1972, now U.S. Pat. No. 3,756,942 has been attempted using this type of catalyst which had been previously severely steam treated. It was found to be substantially impossible to aromatize paraffinic hydrocarbons as set forth in such application with such steamed catalyst. It is of interest to note, however, that such steamed catalyst is still quite active for aromatizing ether reactants. An additional unexpected aspect of this invention resides in the discovery that, although it is usual and common for conversion reactions carried out in the presence of and in contact with zeolite catalysts in general to form coke and deposit such on the zeolite catalyst whereby gradually deactivating the catalyst, the coke make deposited on the catalyst of this invention in the process of this invention is exceedingly small, much smaller than that encountered when subjecting corresponding hydrocarbon feeds to the same conversion conditions.

It is interesting to note that while aromatization of hydrocarbons, even unsaturated hydrocarbons, is initiated to a meaningful extent at about 650°F and is maximized from a commercially desirable product distribution point of view at about 1000°F, aromatization of lower ethers to generally the same commercially acceptable product distribution initiates at about 500°F and is maximized at about 700°F. Contacting aliphatic hydrocarbons with this type of aluminosilicate zeolites in the same temperature and other operating condition ranges as set forth above according to this invention does not induce significant production of new aromatic rings but more usually tends to alkylate preformed, co-fed aromatic ring moieties. In this regard it should be understood that there is not a clear line of demarcation between operating conditions which induce alkylation as opposed to aromatization of fed aliphatic hydrocarbons according to previously described processes. Similarly, there is not a clear line of demarcation in product distribution as a function of temperature in the process of this invention. It can be said in general that lower temperatures favor olefin formation and higher temperatures, which are still generally lower than hydrocarbon aromatization temperatures, favor aromatization.

The following Examples are illustrative of this invention without being limiting on the scope thereof. Parts and percentages are by weight unless expressly stated to be the contrary.

EXAMPLES 1–4

In each example the catalyst used was 65% H ZSM-5 in an alumina matrix which was pelletized to 30/60 mesh size. The reactor was of the downflow type. The feed was dimethyl ether, the temperature of reaction 700°F, and the space velocity was 1.65 in Example 1 and 1.44 WHSV in the remaining examples. Pressures were 1, 5.5, 25 and 50 atmospheres respectively to induce conversions of 99.9+, 99.2, 99.3 and 98% respectively. The product distribution is set forth in the following Table:

TABLE

| Example No. | 1 | 2 | 3 | 4 |
|---|---|---|---|---|
| Hydrocarbon Product Distribution (%) | | | | |
| $C_4^-$ | 40.94 | 28.84 | 26.40 | 25.44 |
| $C_5^+$ Aliphatic | 17.62 | 33.83 | 37.18 | 35.12 |
| $C_6^+$ Aromatics | 41.44 | 37.33 | 36.42 | 39.38 |

The process of this invention can be carried out in rather conventional up-flow or down-flow reactors packed with ZSM-5 type of aluminosilicate zeolite catalyst. The zeolite catalyst suitably occupies about 1 to 100% of the reaction zone volume and may be used in a fixed or fluidized bed arrangement. Suitable heating and/or cooling means may be employed according to conventional reaction zone temperature profiling design. The catalyst is suitably of a particle size of about 4 to 325 mesh.

EXAMPLE 5

This examples illustrates the conversion of dimethyl ether to (predominantly) olefins.

T 800°F  Catalyst 65% H ZSM-5/35% $Al_2O_3$
P 1 atm.
WHSV 428
Conversion per pass   23.1%

Hydrocarbon Product Distribution (%)

| Olefins | | | |
|---|---|---|---|
| | $C_2^{==}$ | 13.63 | |
| | $C_3^=$ | 29.57 | |
| | $C_4^=$ | 18.39 | 67.81 |
| | $C_5^=$ | 6.22 | |
| Paraffins | $C_1 - C_5$ | 19.07 | |
| Non-aromatic | $C_6^+$ | 6.79 | |
| Aromatics | | 6.33 | |

EXAMPLE 6

Di-n-hexyl ether

T = 700°F
P = 1 atm.
WHSV = 1.26
Catalyst 65% H-ZSM-5/35% $Al_2O_3$ (1/16" extrudate)

Conversion 100%

Hydrocarbon Product Distribution (%)

| | | |
|---|---|---|
| | $C_4^-$ | 49.18 |
| Aliphatic | $C_5^+$ | 13.12 |
| Aromatics | $C_6^+$ | 37.70 |

EXAMPLE 7

Tetrahydrofluran

T = 700°F
P = 1 atm.
WHSV = 1.39
Catalyst 65% H ZSM-5/35% $Al_2O_3$ (1/16" extrudate)

Conversion 99.3%

Hydrocarbon Product Distribution (%)

| | | |
|---|---|---|
| | $C_4^-$ | 27.41 |
| Aliphatic | $C_5^+$ | 6.43 |
| Aromatic | $C_6^+$ | 66.16 |

EXAMPLE 8

$CH_3O\ CH_2O\ CH_3$ (methylal)

T = 700°F
P = 1 atm.
WHSV = 1.35
Catalyst 65% H ZSM-5/35% $Al_2O_3$ (1/16" extrudate)

Conversion 100%

Hydrocarbon Product Distribution (%)

| | | |
|---|---|---|
| | $C_4^-$ | 41.65 |
| Aliphatic | $C_5^+$ | 10.27 |
| Aromatic | $C_6^+$ | 48.08 |

What is claimed is:

1. A process for converting aliphatic ethers containing a hydrocarbon constituent which comprises contacting at least one aliphatic ether with a crystalline aluminosilicate zeolite having a silica to alumina ratio of at least about 12 and a constraint index of about 1 to 12 at an elevated temperature of about 500° to about 1000°F, a pressure of about 0 to 3000 psig and a space velocity of about 0.5 to 1000 WHSV under such combination of conditions as to convert said ether to a product comprising hydrocarbon compounds having a higher molecular weight than the longest hydrocarbon constituent of a respective reactant ether.

2. A process as claimed in claim 1 wherein said ether has an alkyl constituent of 1 to 8 carbon atoms.

3. A process as claimed in claim 1 wherein said ether is a mixed alkyl ether.

4. A process as claimed in claim 1 wherein said catalyst is H-ZSM-5.

5. A process as claimed in claim 1 carried out at least about 500°F to produce aromatic moieties of longer hydrocarbon chain length than the reactant ether.

6. A process as claimed in claim 1 wherein said ether is dimethyl ether.

7. A process as claimed in claim 1 utilizing a reactant comprising dimethyl ether, which dimethyl ether is at least partially converted to new aromatic ring moieties.

8. A process as claimed in claim 1 wherein said zeolite has a crystal density in the hydrogen form of not substantially below about 1.6 grams per cubic centimeter.

9. A process of converting an aliphatic ether to an aromatic hydrocarbon by contacting said ether with a crystalline aluminosilicate zeolite having a silica to alumina ratio of at least about 12 and a constraint index of about 1 to 12 at a temperature of about 500° to 1000°F, a pressure of about 0 to 3000 PSIG and a space velocity of about 0.5 to 1000 WHSV.

* * * * *